United States Patent [19]

Bauer et al.

[11] Patent Number: 5,447,105

[45] Date of Patent: Sep. 5, 1995

[54] GAS GENERATOR

[75] Inventors: Hermann Bauer, Stöttham; Richard Bender, Lauf; Rudolf Hawly, Waldkraiburg, all of Germany

[73] Assignee: TEMIC Bayern-Chemie Airbag GmbH, Aschau, Germany

[21] Appl. No.: 336,651

[22] Filed: Nov. 4, 1994

[30] Foreign Application Priority Data

Nov. 11, 1993 [DE] Germany .................. 43 38 536.2

[51] Int. Cl.⁶ .................. C06D 5/00; B60R 21/16
[52] U.S. Cl. .................. 102/530; 102/202.14; 280/740; 280/741; 280/742; 422/164
[58] Field of Search .......... 102/202.5, 202.7, 202.8, 102/202.14, 472, 530, 531; 280/736, 740, 741, 742; 422/164–165, 166, 167

[56] References Cited

U.S. PATENT DOCUMENTS

| 333,655 | 1/1886 | Michaelis | 102/202.5 |
|---|---|---|---|
| 3,142,253 | 7/1964 | Seavey et al. | 102/202.14 |
| 3,211,097 | 10/1965 | Foote | 102/202.14 |
| 3,990,367 | 11/1976 | Smith | 102/531 |
| 4,005,876 | 1/1977 | Jorgensen et al. | 280/741 |
| 4,012,211 | 3/1977 | Goetz . | |
| 4,158,696 | 6/1979 | Wilhelm | 280/736 |
| 4,191,392 | 3/1980 | Barnett . | |
| 4,200,615 | 4/1980 | Hamilton et al. | 280/741 |
| 4,203,787 | 5/1980 | Kirchoff et al. . | |
| 4,358,998 | 11/1982 | Schneiter et al. . | |
| 4,369,079 | 1/1983 | Shaw . | |
| 4,380,346 | 4/1983 | Davis et al. | 280/736 |
| 4,402,269 | 9/1983 | Smith | 102/202.5 |
| 4,547,342 | 10/1985 | Adams et al. . | |
| 4,745,858 | 5/1988 | Harder | 102/202.5 |
| 4,858,951 | 8/1989 | Lenzen . | |
| 4,878,690 | 11/1989 | Cunningham | 280/741 |
| 5,224,734 | 7/1993 | Swiderski | 280/741 |
| 5,275,431 | 1/1994 | Stephens | 280/741 |

FOREIGN PATENT DOCUMENTS

| 0069441 | 9/1983 | European Pat. Off. . | |
|---|---|---|---|
| 0403857 | 12/1990 | European Pat. Off. . | |
| 546791 | 6/1993 | European Pat. Off. | 280/736 |
| 2712963 | 11/1977 | Germany . | |
| 3914690 | 9/1990 | Germany . | |
| 3920401 | 1/1991 | Germany . | |
| 9013131 | 1/1991 | Germany . | |
| 4135299 | 4/1993 | Germany . | |
| 9312093 | 12/1993 | Germany . | |

OTHER PUBLICATIONS

Spur et al, Handbuck der Fertigungstechnik, "Umformen", vol. 2/2, Jun. 1994, pp. 928–929.

*Primary Examiner*—Harold J. Tudor
*Attorney, Agent, or Firm*—Spencer, Frank & Schneider

[57] ABSTRACT

An essentially cylindrical gas generator for generating combustion gases. The gas generator includes a housing having gas outlet openings; a combustion chamber surrounded by the housing; gas-generating fuel disposed in the combustion chamber; an igniting device disposed in the combustion chamber for igniting the fuel; a first filter disposed between the fuel and the gas outlet openings for prefiltering generated gases upon passage thereof from the combustion chamber through the first filter toward the outlet openings; a second filter disposed between the first filter and the outlet openings for filtering the gases upon passage thereof from the first filter through the second filter; and a generally tubular body surrounding the second filter. The tubular body is surrounded by the housing, and is composed of a plurality of third filters and a plurality of guide plates circumferentially alternating with the third filters. The guide plates are disposed in a path of the gases exiting from the second filter, for guiding the gases in a circumferential direction along the second filter to the third filters for passage therethrough and through the outlet openings.

4 Claims, 3 Drawing Sheets

GAS GENERATOR

BACKGROUND OF THE INVENTION

The invention relates to a gas generator of essentially cylindrical or tubular construction containing a solid propellant or solid fuel for ignition in a combustion chamber by an electrically activatable igniter, with filter media for cooling and filtering the generated gas before this escapes for inflating a restraining medium such as an airbag. Tubular generators of the type or family concerned here have been known for a considerable time, refer for instance to U.S. Pat. No. 4,878,690 and the patent publications referred to therein.

The tubular generator here comprised essentially a single solid cylinder representing the combustion chamber housing.

SUMMARY OF THE INVENTION

The object of the invention is to specify a cost-effective construction that is easy to assemble without impairing the quality of the end product.

According to the invention, the gas generator is constructed as follows:

- a combustion chamber cylinder open at one face end, having at the other face end both a central igniter and also a peripheral holding and centering ring;
- a prefabricated filter that can be pushed into the combustion chamber cylinder, in particular for prefiltering and cooling, essentially in the shape of a strip, covering the openings in a partial area of the periphery of the combustion chamber cylinder;
- a second tubular prefabricated filter surrounding (concentrically) the combustion chamber cylinder, held in an outer housing made of sheet metal with gas outlets, securely held on the periphery and at the face ends to the combustion chamber cylinder between the holding and centering ring mounted on the one closed end wall and also secured on a cover with a protrusion for positive connection with the tubular filter.

BRIEF DESCRIPTION OF THE DRAWINGS

An embodiment example of the invention is described below with reference to the drawings. These show.

DESCRIPTION OF THE PREFERRED EMBODIMENTS

Figure 1:
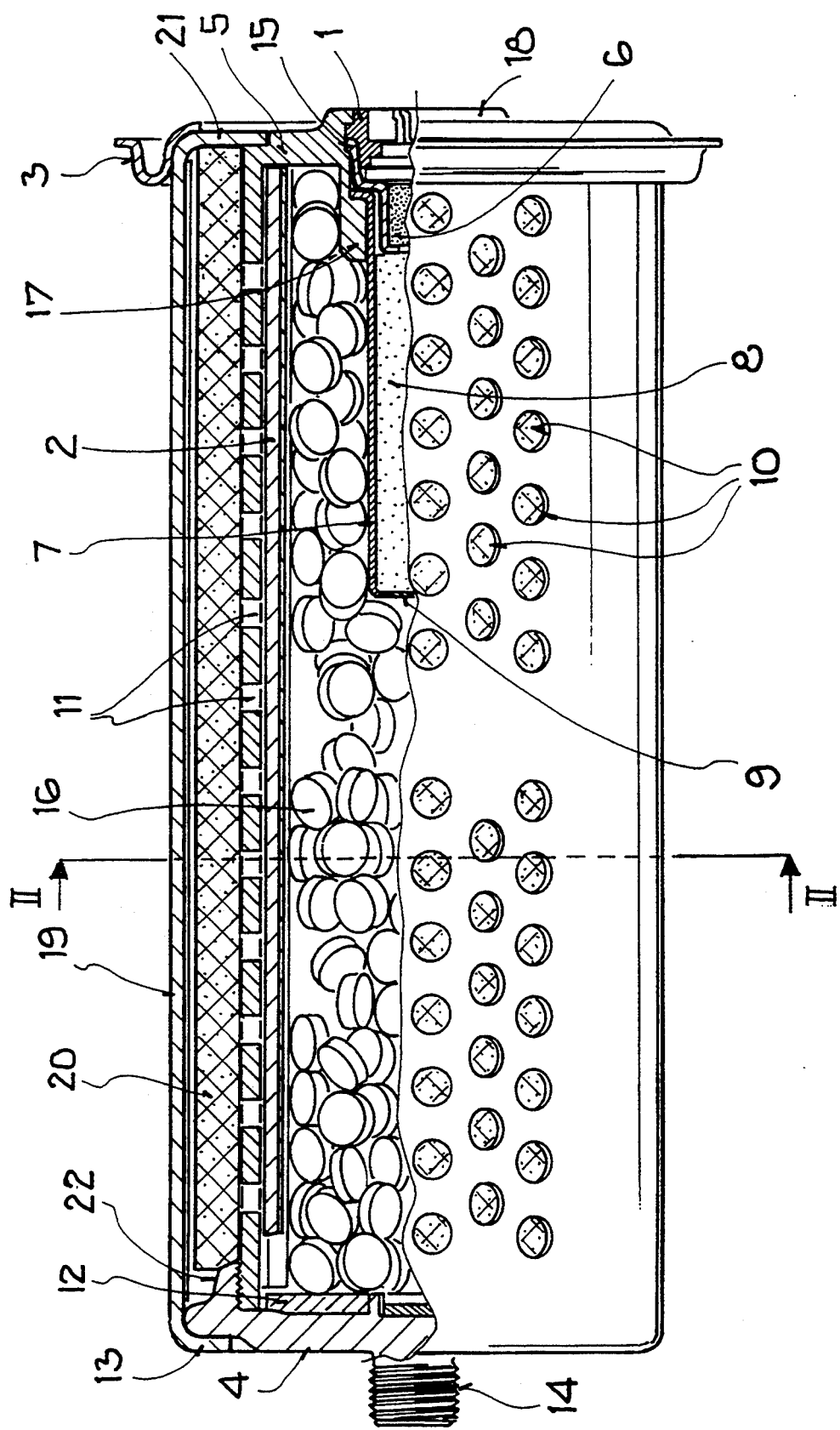
FIG. 1 is a partially sectional, longitudinal view of a fully assembled gas generator of the present invention.

As FIG. 1 shows, the new gas generator has an essentially cylindrical shape. A propellant 16 is used for generating the gas, shown here in the form of tablets, made of solid propellant material of a type already known. This propellant is ignited by an electrical igniter 8, usually consisting of a powder mixture and contained in a sleeve 7. The generated gas initially flows through a first filter 2 and then through openings 11 in a tubular plug-in module 5 whose face end is made as a single piece with the tube in the area of the igniter 8 and closes this with one end and where there is a mounting element 17 formed at the face end for introducing the sleeve 7 of the igniter 8.

Figure 2:
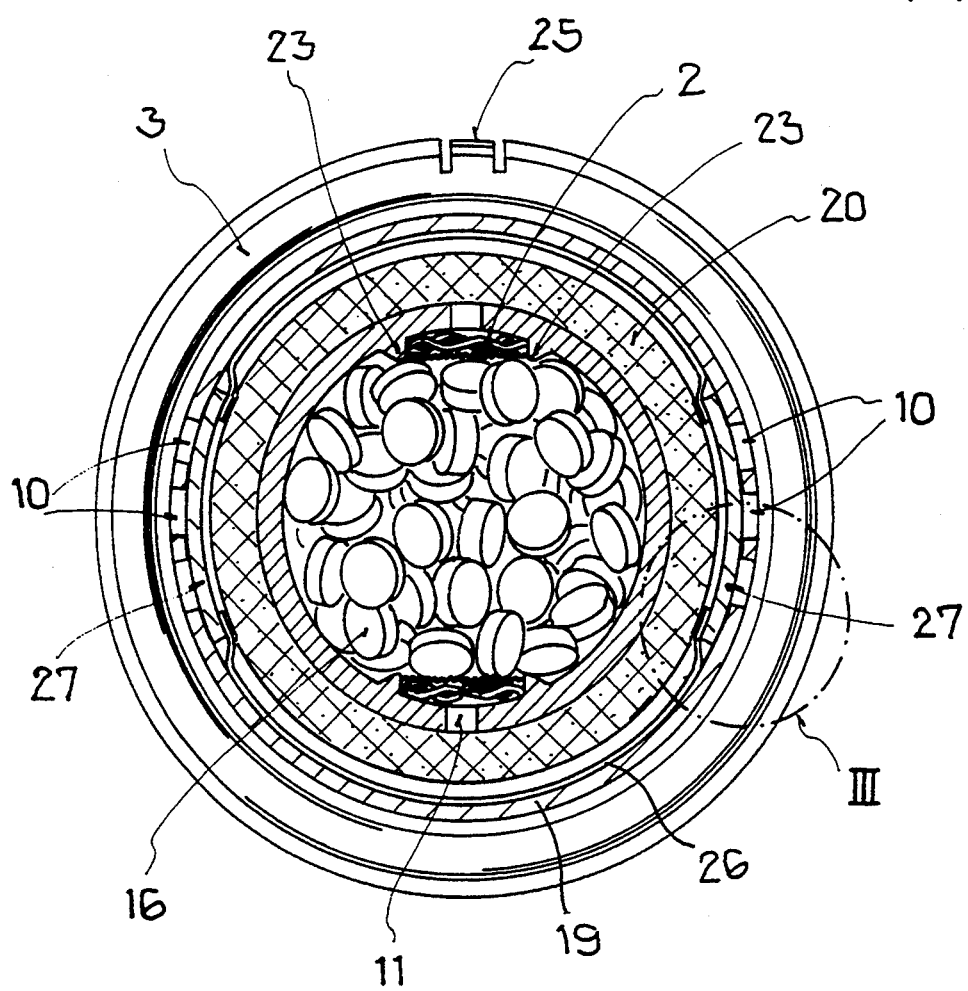
FIG. 2 is a cross-sectional view of the gas generator of FIG. 1 along lines II—II.

The first filter 2, preferably of wire-mesh and/or single wires, is situated inside the plug-in module 5, as shown in FIG. 2, pushed in and guided and held longitudinally at protrusions 23.

In a radial direction towards the outside, the plug-in module 5 is followed by a second tubular or hollow cylindrical filter 20 contained in a cylindrical sheet-metal housing 19 that closes off towards the outside and that has at a face end a holding and centering ring 3 for affixing the assembled gas generator to a structure of the vehicle.

At the other face end, the housing 19 is flanged over at 13 and encloses the cover 4. This cover 4 ends at a threaded bolt 14 for holding the other end of the module in the structure. At the opposite face end there is in the plug-in module 5 a closing element 1 with electrical contacts, in particular a plug contact socket. The connector supplies electrical power to an ignition pill 6 which is fitted and held in a ring 15. These parts are placed together with the sleeve 7 for the igniter 8 in the mounting bush 17 of the module 5, as shown in FIG. 1. Housing 19 has numerous outlets 10 leading to the airbag and is also flanged over at 21 and thus fixed to module 5. The cover 4 has a protrusion 22 for positive connection to filter 20 so that the latter is secured to the cover.

In order to compensate for any possible differences in the degree of filling, of propellant, here tablets 16, there is a filling element 12 on the inside of the end wall of cover 4. This filling element is annular in shape and is made of a compressible plastic material, e.g. a silicon foam or PE foam which can readily be produced from matting, that is preassembled and held in cover 4 before the latter is itself assembled with the other parts as shown in FIG. 1 and which closes the end of the gas generator.

Figure 3:
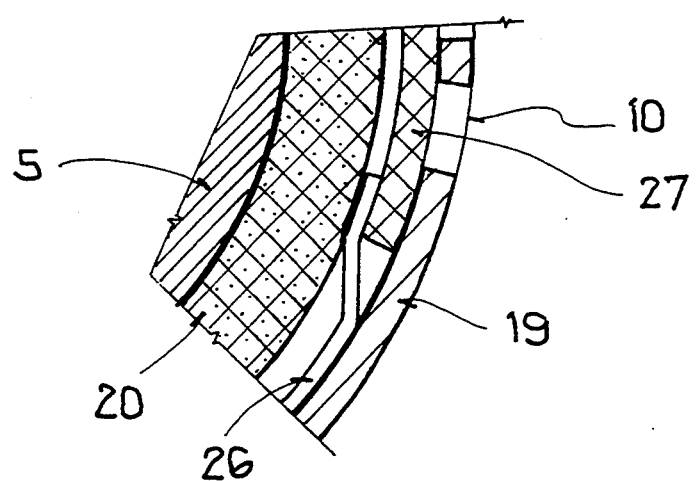
FIG. 3 is a view similar to FIG. 2 showing the details of the region identified by numeral III.
Figure 5:
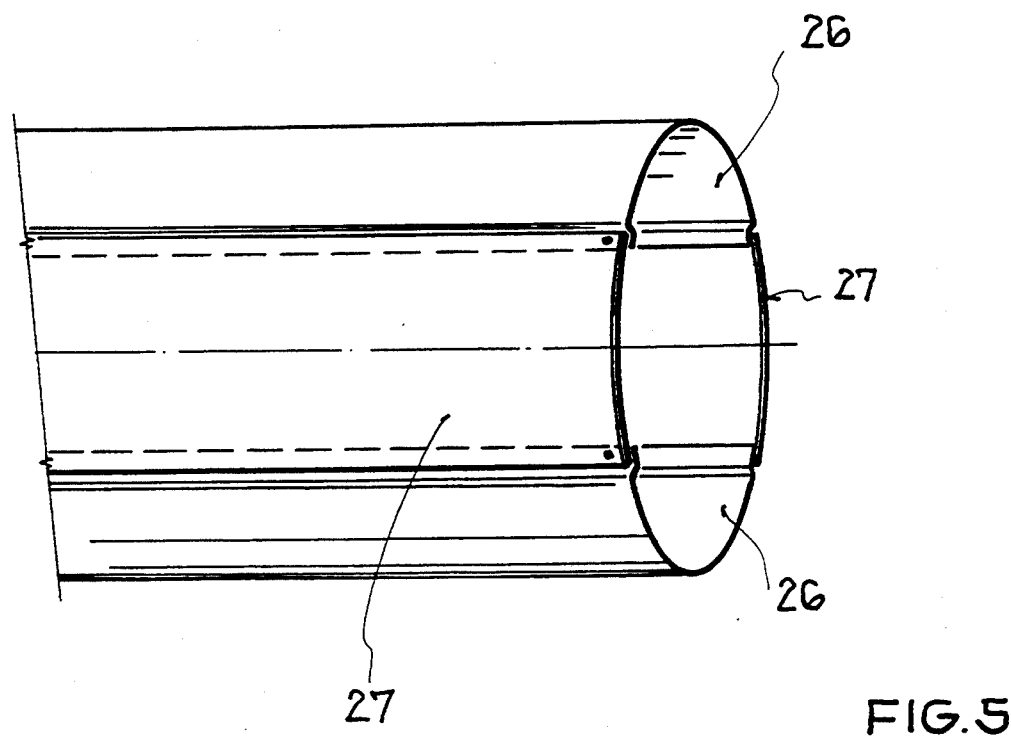
FIG. 5 is a perspective view of parts of the filter tube in assembled form, with gaps having been left free on the periphery.

The holding and centering ring 3 is also preassembled on the outer sheet-metal housing 19 and it has a latching or positioning nose or bead 25 which makes it possible to fix a location in the direction of rotation as shown in FIG. 2. As FIG. 5 shows, two or four folds 26 are provided as guide plates that guide the gas flow towards a fine filter (wire mesh) 27 as shown in FIG. 3. As may be seen in FIG. 5 in conjunction with FIG. 2, the filter 20 is surrounded by a tubular body composed of fine filters 27 circumferentially alternating with guide plates 26. Thus, as the gases radially outwardly exit the filter 20 in a zone where no filter 27 is present, they are guided circumferentially along the filter 20 in the direction of filters 27.

FIG. 2 shows again the filter unit comprising the prefabricated cylinder of filter mesh 20, fine filter inlays 27 with the above-mentioned guide plates 26, and the all-surrounding housing 19. The preassembled filter unit is pushed over the plug-in module 5 and thus acts as both coarse and fine filter for the solid residues. As can further be seen from FIG. 2, the outlets 10 are arranged in diametrically oppositely located zones and the filters 27 are situated at those zones.

Figure 4:
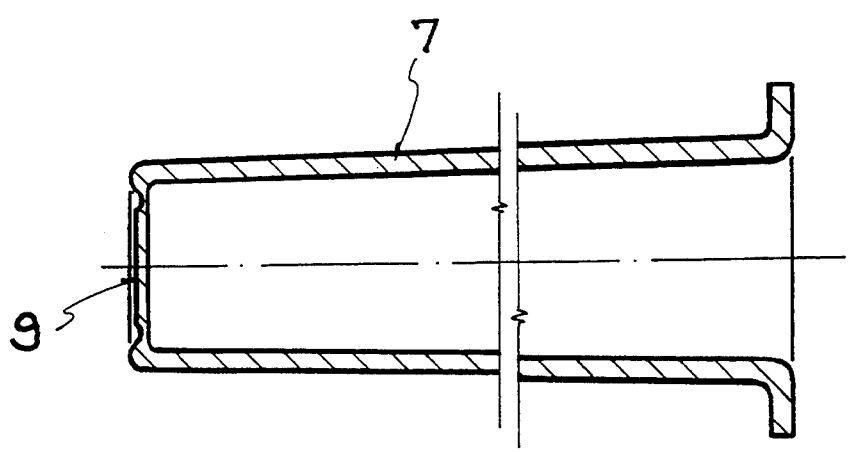
FIG. 4 is a cross-sectional view of a tapered sleeve for the igniter as shown in FIG. 1.

The sleeve 7 for the igniter 8 is of conical shape and can thus be inserted positively in the closed end of part 5 from the right in FIG. 1 and is held there by wedge action. The sleeve 7 is of aluminum alloy made in one piece by a cold-impact press forming process and of tapered cross-section when viewed longitudinally. It also has an integrated bursting diaphragm 9, as can be seen with particular clarity in FIG. 4.

The invention offers the following advantages:
the conical design of the sleeve made by a cold-impact press forming process makes assembly easy;
the integrated bursting diaphragm at the face end of sleeve 7 provides oriented ignition.

Because a cylindrical filter mesh 20 is combined with the plug-in module 5 as filter unit, the module can be completely preassembled externally, and it is also possible to conduct the gas flow in a defined manner along the fine filter 27 with the aid of the guide plates 26 in accordance with FIGS. 2 and 3 in order to avoid bypass flow. This prevents the uncontrolled output of slag and ensures proper assembly.

Assembly of the new gas generator is also simplified by the fact that a centering ring 3 can be made preassembled in the positioned location to the filter outlet openings 10 on the filter tube. The centering ring 3 is preferably deep-drawn from a sheet-metal disk, generally made of stainless steel, and then attached to the filter tube, here the sheet-metal housing 19. This centering also serves to seal to prevent gas from escaping while gas is being generated by burning of the solid fuel provided in the form of tablets 16.

What is claimed is:

1. An essentially cylindrical gas generator for generating combustion gases, comprising
   (a) a housing having gas outlet openings;
   (b) means for defining a combustion chamber surrounded by said housing;
   (c) gas-generating fuel disposed in said combustion chamber;
   (d) igniting means disposed in said combustion chamber for igniting said fuel;
   (e) a first filter disposed between said fuel and the gas outlet openings for prefiltering generated gases upon passage thereof from the combustion chamber through said first filter toward said outlet openings;
   (f) a second filter disposed between said first filter and said outlet openings for filtering the gases upon passage thereof from said first filter through said second filter; and
   (g) a generally tubular body surrounding said second filter; said tubular body being surrounded by said housing and being composed of
      (1) a plurality of third filters and
      (2) a plurality of guide plates circumferentially alternating with said third filters; said guide plates being disposed in a path of the gases, exiting from said second filter, for guiding the gases in a circumferential direction along said second filter to said third filters for passage therethrough and through said outlet openings.

2. The gas generator as defined in claim 1, wherein said outlet openings are arranged in diametrically oppositely located outlet opening zones.

3. The gas generator as defined in claim 2, wherein said third filters are situated solely in said outlet opening zones.

4. The gas generator as defined in claim 1, wherein said third filters are wire mesh filters.

* * * * *